United States Patent
Cleave et al.

(10) Patent No.: US 6,854,314 B2
(45) Date of Patent: Feb. 15, 2005

(54) SHEET METAL TOOL STAND (75) Inventors: Jeffrey Van Cleave, Troy, MI (US); Joseph W. Pawlow, Redford, MI (US); Eugene G. Eichhorn, Pinckney, MI (US)

(73) Assignee: Van Mark Products Corporation, Farmington Hills, MI (US)

( * ) Notice: Subject to any disclaimer, the term of this patent is extended or adjusted under 35 U.S.C. 154(b) by 154 days.

(21) Appl. No.: 09/952,917

(22) Filed: Sep. 14, 2001

(65) Prior Publication Data

US 2003/0051526 A1 Mar. 20, 2003

(51) Int. Cl.[7] .............................................. B21D 5/02
(52) U.S. Cl. ...................... 72/319; 248/676; 144/286.5; 144/286.1; 83/859
(58) Field of Search ............................ 72/319; 248/676, 248/689, 671, 670, 673, 163.1; 144/286.1, 286.5; 83/859; 269/99, 93, 900

(56) References Cited

U.S. PATENT DOCUMENTS

| | | | |
|---|---|---|---|
| 131,239 A | | 9/1872 | Adler et al. |
| 516,026 A | | 3/1894 | Seaver |
| 756,058 A | * | 3/1904 | Royle ........................... 269/93 |
| 934,701 A | | 9/1909 | Swanson |
| 1,147,458 A | | 7/1915 | Steely |
| 1,376,077 A | * | 4/1921 | Cadwallader ................. 269/93 |
| 1,575,235 A | * | 3/1926 | Tiffany ....................... 248/673 |
| 1,724,215 A | | 8/1929 | Moran |
| 1,975,857 A | | 10/1934 | McKenney |
| 2,181,566 A | | 11/1939 | Jensen |
| 2,343,441 A | | 3/1944 | Babcock et al. |
| 2,434,028 A | | 1/1948 | Wieland |
| 3,937,343 A | | 2/1976 | Spulak |
| 4,155,386 A | * | 5/1979 | Alessio .................... 144/286.1 |
| D252,388 S | | 7/1979 | Fjells-Jensen |
| 4,186,784 A | * | 2/1980 | Stone ....................... 144/253.2 |
| 4,223,881 A | | 9/1980 | Hickman |
| 4,265,283 A | * | 5/1981 | Nash et al. ............... 144/286.5 |
| 4,415,149 A | | 11/1983 | Rees |
| 4,713,957 A | | 12/1987 | Eder et al. |
| 4,776,545 A | * | 10/1988 | Miyamoto ................... 248/558 |
| D304,650 S | | 11/1989 | Price |

(List continued on next page.)

FOREIGN PATENT DOCUMENTS

| | | | | |
|---|---|---|---|---|
| CH | 403677 | | 6/1966 | |
| EP | 0 474935 | * | 3/1992 | ............. 144/286.1 |
| FR | 2504429 | | 10/1982 | |
| GB | 2 206 069 A | | 12/1988 | |

OTHER PUBLICATIONS

Cidan Advertisement—Folding Machine Model SB, 1 Page.
Jouanel Industrie Advertisement, 9–96, 1 Page.
Schechtl Advertisement, p. 80.
Van Mark Advertisement—Mark IV Industrial Portable Bending Brake, 2 Pages.
Dimos Brochure, 11–91, 2 Pages.
Van Mark Advertisement—Coil Dispenser™, 2000, 1 Page.
J–Dan Advertisement—The Tradesmen®, Apr. 4, 2001, 1 Page.

*Primary Examiner*—Daniel C. Crane
(74) *Attorney, Agent, or Firm*—Brooks Kushman P.C.

(57) ABSTRACT

A stand for sheet metal tools is provided that may accommodate different types and sizes of sheet metal tools. The stand is intended to be used with portable sheet metal bending brakes, saw tables, coil slitters and coil holders. The stand has a versatile clamping system utilizing detachable anchor plates that may be secured in different locations and positions on the stand. A longitudinal extension may be incorporated as part of the stand or part of the support structure for sheet metal tools and a rear mounted roller table may also be provided in conjunction with the stand.

14 Claims, 7 Drawing Sheets

U.S. PATENT DOCUMENTS

| | | | |
|---|---|---|---|
| 4,909,491 A | | 3/1990 | Cheng |
| 5,067,535 A | | 11/1991 | Wolff |
| 5,087,013 A | * | 2/1992 | Gress et al. ................. 248/676 |
| 5,105,862 A | | 4/1992 | Skinner et al. |
| 5,135,036 A | * | 8/1992 | Caron ..................... 144/286.5 |
| 5,161,590 A | * | 11/1992 | Otto ........................ 144/286.5 |
| 5,320,150 A | | 6/1994 | Everts et al. |
| 5,383,977 A | * | 1/1995 | Pearce ......................... 144/1.1 |
| 5,407,171 A | * | 4/1995 | Gonzalez .................... 248/670 |
| 5,479,840 A | * | 1/1996 | Hilliard et al. ............ 83/477.2 |
| 5,542,639 A | * | 8/1996 | Wixey et al. ............... 248/439 |
| 5,560,582 A | * | 10/1996 | Beelen ....................... 248/588 |
| 5,651,298 A | | 7/1997 | Break et al. |
| 5,681,034 A | | 10/1997 | Noniewicz |
| 5,743,129 A | | 4/1998 | Chubb et al. |
| 5,857,507 A | * | 1/1999 | Puzio et al. ................ 144/287 |
| 5,884,681 A | * | 3/1999 | Nickles ...................... 144/329 |
| 5,927,436 A | | 7/1999 | Schutz |
| 6,070,696 A | | 6/2000 | Chubb et al. |
| D437,864 S | | 2/2001 | Van Cleave et al. |
| 6,435,460 B1 | * | 8/2002 | Van Cleave et al. ........ 248/164 |

* cited by examiner

SHEET METAL TOOL STAND

BACKGROUND OF THE INVENTION

1. Field of the Invention

The present invention relates to a stand for sheet metal tools that may be used with one or more sheet metal tools having bases that may have different dimensions.

2. Background Art

Sheet metal tools used on a job site are designed to be portable and must be easily knocked down to permit transporting in a pick-up truck or van. Portable sheet metal tools include bending brakes, saw tables, coil holders and coil slitters. These types of tools are used in the sheet metal trades to form soffit, fascia and other siding trim pieces and sheet metal roofs.

Available stands for such sheet metal tools include saw horses, conference table legs, and stands having vertical legs. These types of stands do not provide a simple and effective mechanism for anchoring a variety of construction and remodeling tools.

Banquet table leg stands are one of the most commonly used stands for such tools. Banquet table leg type stands have welded joints that may break if they are moved around a job site with a heavy tool on the stand.

It would be desirable to provide a stand for portable sheet metal tools that can be used to support different sizes and types of portable sheet metal tools at a convenient height with a set of standardized anchoring or clamping devices. It would also be advantageous to provide anchors that can accommodate many different types of tools. There is a need for a stand with anchors that can anchor various tools securely in place to provide a stable base. Such a universal sheet metal tool stand must be designed to provide heavy duty performance while being both durable and lightweight. Further, such a universal stand preferably includes built in wheels and must be easy to knock down or disassemble to facilitate shipment and transportation to a job site. The stand should also have easy-to-use connectors that may be assembled and disassembled at a job site without requiring the use of tools.

Further, particularly in connection with the use of coil slitters that are used to slit coils to form long blanks for subsequent fabrication, there is a need for convenient extensions and support tables for supporting coil stock after it is slit. For example, there is a need for a roller table for supporting heavy roofing sheet metal stock rearward of a slitter after it is slit. There is also a need for a compact and easily stored extension for slitters and saw tables to support material extending in a longitudinal direction relative to the stand.

These and other problems and objectives are addressed by the Applicants' invention as summarized below.

SUMMARY OF THE INVENTION

According to one aspect of the present invention, a stand is provided in combination with one or more of a plurality of detachable sheet metal tools. Each of the sheet metal tools may have different longitudinal and transverse dimensions and yet may be conveniently secured to the stand with anchors that may accommodate a wide variety of construction and remodeling tools. The stand preferably includes a frame having a plurality of legs supporting at least two top members. A fixed anchor plate is provided on each of the top members. A plurality of detachable clamping plates are selectively secured to either one of the top members or one of the legs in a range of spaced locations relative to the fixed anchor plate depending upon the size and configuration of the sheet metal tool. Accordingly, a wide variety of sheet metal tools may be anchored securely in place to the stand by the fixed anchor plates and the detachable anchor plates.

According to another aspect of the invention, the frame includes a pair of front legs, a pair of rear legs, a plurality of fixed lower transverse members connecting one of the front legs to one of the rear legs. A front longitudinal brace connects the front legs and a rear longitudinal brace connects the rear legs. The two top members are provided at opposite sides of the stand and connect an upper end of one of the front legs to an upper end of one of the rear legs. Built-in wheels may be provided on two or four legs to facilitate moving the stand at a job site. The frame may be provided with cross braces for additional stability. The stand is collapsible for easy transport and storage. It also features interchangeable components that facilitate manufacture.

According to another aspect of the invention, the detachable clamping plates have a body including a primary wall and two side walls extending perpendicularly from opposite lateral sides of the primary wall. The primary wall is longer than the side walls and defines an extension extending in one direction initially in the same plane as the primary wall and then extending perpendicularly from a distal end of the extension and transversely relative to the lateral side walls.

The detachable clamping plates may also be characterized as having a channel shaped portion and a hooked end portion. The channel shaped portion has an opening for receiving a fastener that is provided to secure the detachable clamping plates to the frame with the hooked end portion securing a portion of the sheet metal tool to the stand.

The detachable clamping plates may alternatively be characterized as having one end that is adapted to engage a portion of the sheet metal tool to secure the tool to the stand. The other portions of the clamping plates are secured by fasteners to adjustably secure each of the clamping plates to the stand. The fastener system may comprise a threaded bolt received by a nut wherein the fastener extends through at least one slot formed in either the stand or the detachable clamping plate.

According to another aspect of the invention, the sheet metal tools that may be secured to the stand may be a bending brake, a saw table, a coil slitter, or a coil holder.

Telescoping legs may be provided, if desired, to allow the height of the stand to be adjusted. Telescoping cross braces can be used to provide a stand within a range of widths.

According to yet another aspect of the invention, either in the combination described above or as a separate attachment to a different type of portable stand, a roller table may be secured to a stand so that it extends rearwardly from the sheet metal tool supported on the stand. The roller table has a brace extending from an intermediate point on each of the rear legs to the roller table. Further, the roller table may have right and left roller supporting members extending rearwardly from a slitter in a transverse direction with a plurality of rollers extending in a longitudinal direction between the roller support members for supporting material after it is slit.

According to another aspect of the invention, either in the combination described above or in combination with a different style of portable tool stand, elongated tubular supports extending longitudinally relative to the stand may be provided with an extension member that is telescopically received by the tubular supports. The extension member provides additional support for material processed by the sheet metal tool in the longitudinal direction relative to the stand. Further, a coil holder and slitter may both be secured to at least two elongated supports with the extension member supporting the material after it is cut by the slitter and moved in a longitudinal direction relative to the stand.

These and other aspects of the invention will be better understood in view of the attached drawings and detailed description of the several modes described below.

DETAILED DESCRIPTION OF THE PREFERRED EMBODIMENT(S)

Figure 1:
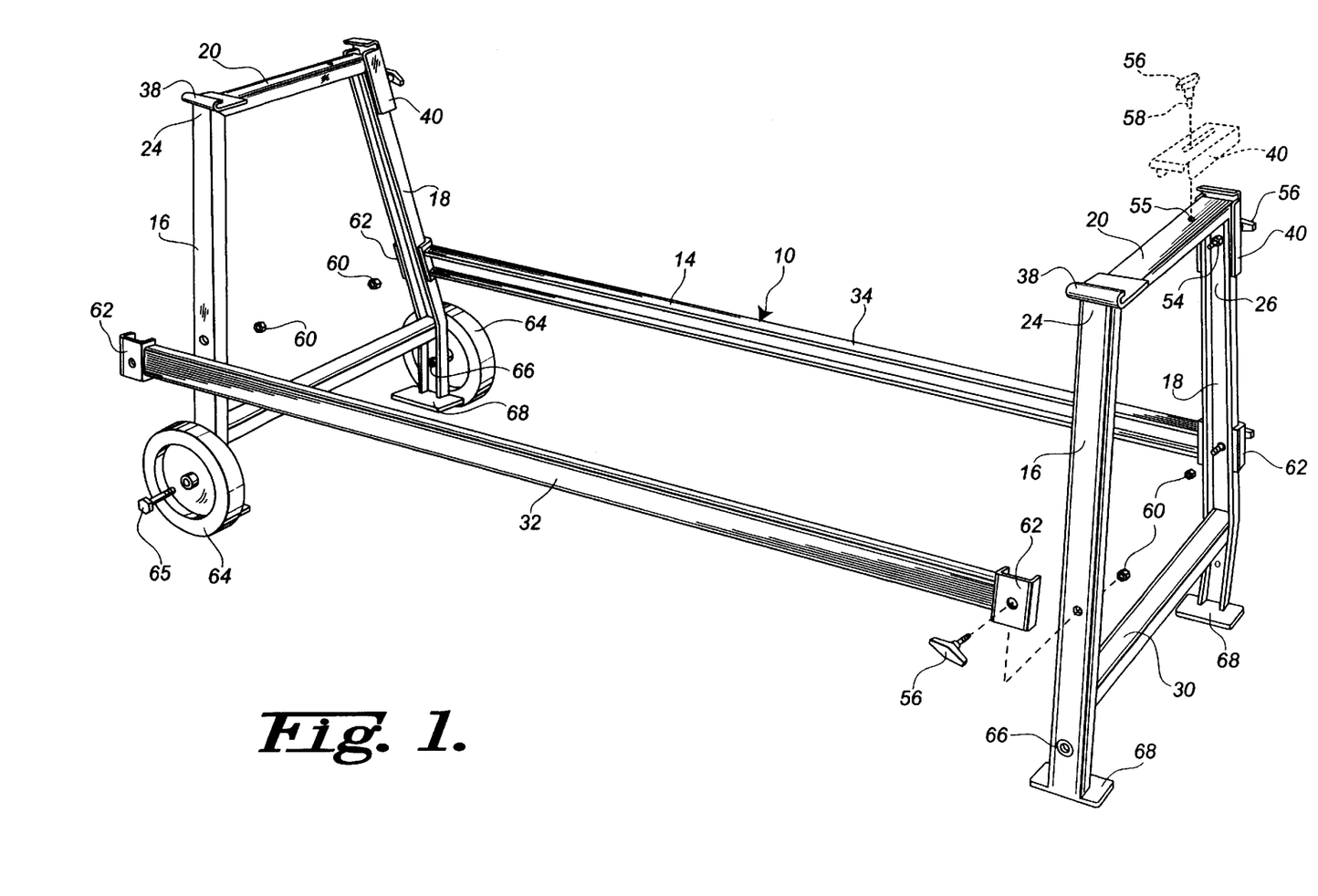
FIG. 1 is a partially exploded perspective view of a sheet metal tool stand.
Figures 3, 4:
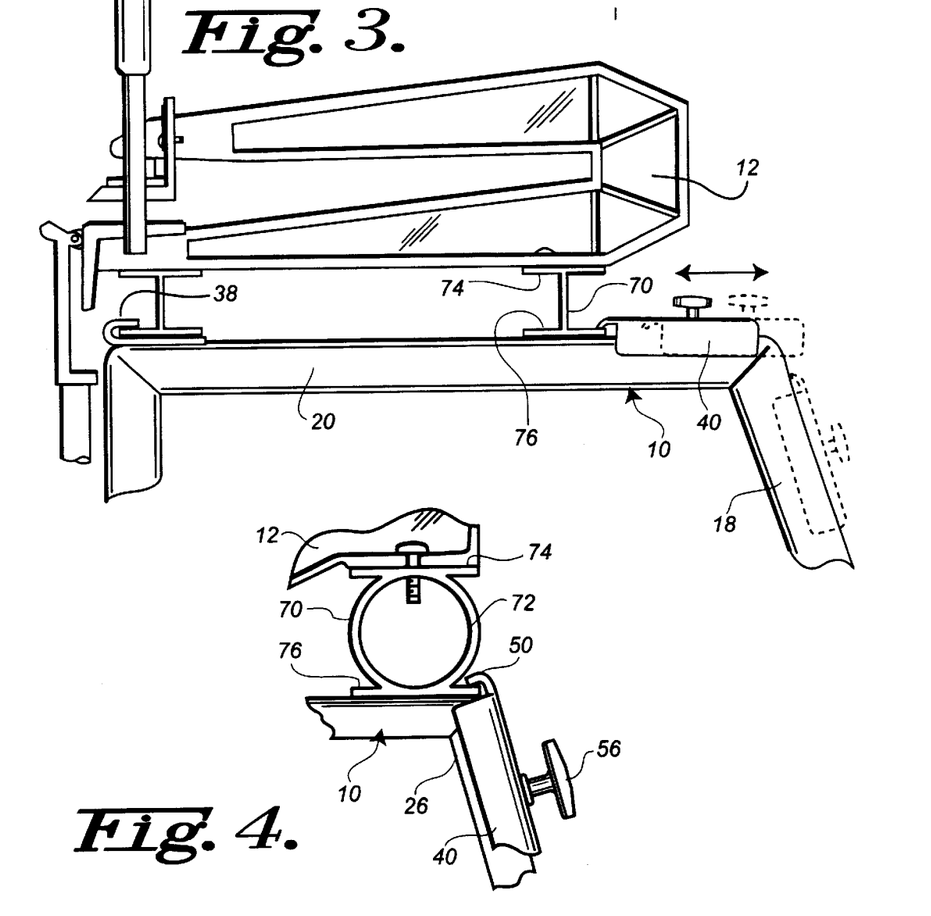
FIG. 3 is a fragmentary side elevation view of a small portable bending brake secured to the stand by a clamping plate attached to a top member.
FIG. 4 is a fragmentary side elevation view of a large portable sheet bending brake secured to the stand by clamping plate attached to a rear leg.
Figure 9:
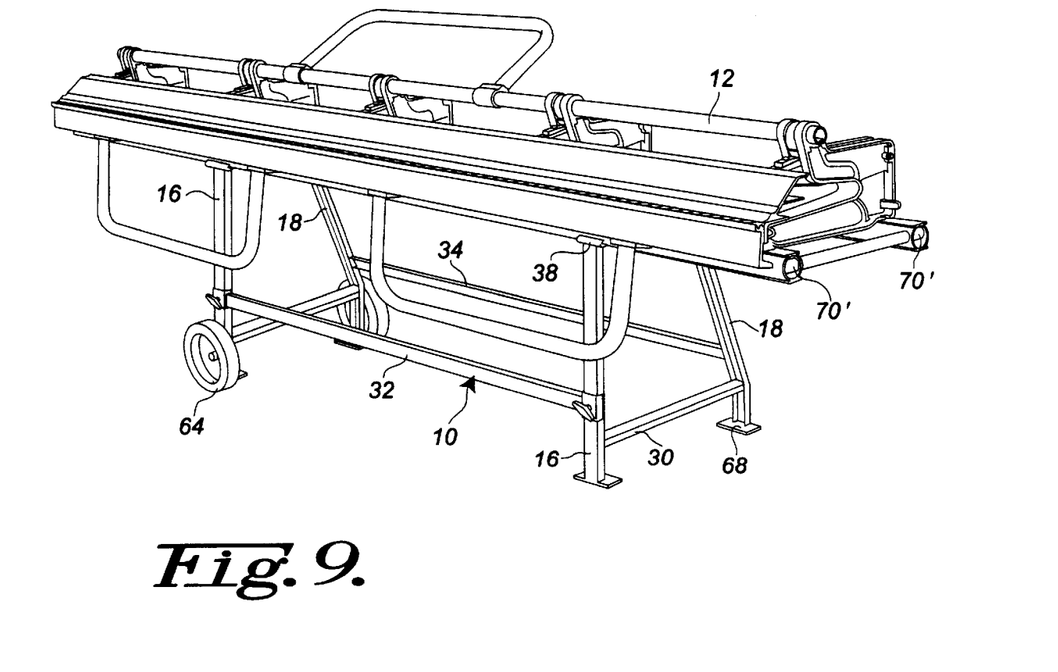
FIG. 9 is a perspective view of a bending brake secured to the stand.

Referring to FIG. 1, a sheet metal tool stand is generally indicated by reference numeral 10. As shown in FIGS. 3 and 9, a portable bending brake 12 is attached to the stand 10. Referring back to FIG. 1, the stand 10 includes a frame 14 that includes front legs 16, rear legs 18, and top members 20. Top members 20 interconnect an upper end 24 of one of the front legs to an upper end 26 of one of the rear legs 18. A lower transverse member 30 interconnects one of the front legs 16 to one of the rear legs 18 at an intermediate location generally near a lower portion of the front leg 16 and rear leg 18. A front longitudinal brace 32 interconnects the two front legs 16 while a rear longitudinal brace 34 interconnects the two rear legs 18.

Fixed anchor plates 38 are provided on the front end of each of the top members 20 adjacent the upper ends 24 of the front legs 16. Detachable anchor plates 40, as shown in FIGS. 1 and 3, are adapted to be secured to the frame 14 on either the rear legs 18 or top members 20 in a range of locations. Alternatively, detachable anchor plates could be substituted for the fixed anchor plates 38.

Figure 2:
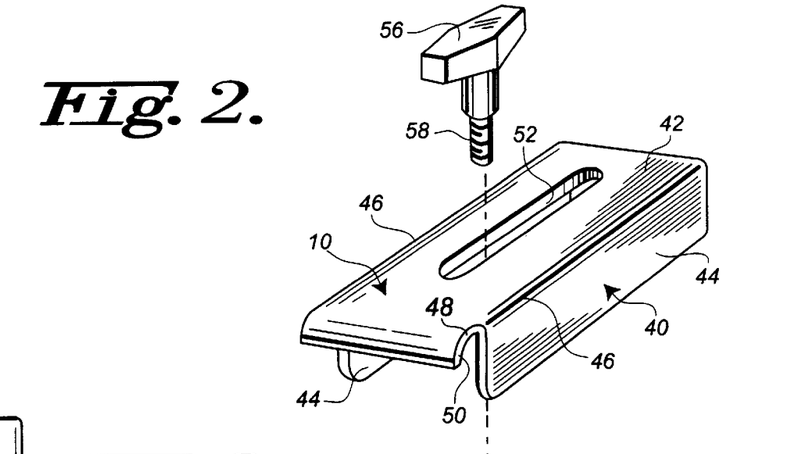
FIG. 2 is a perspective view of a detachable clamping plate.

Referring to FIG. 2, the detachable anchor plates 40 include a primary wall 42 and two side walls 44 that extend perpendicularly from two opposite lateral sides 46 of the primary wall 42. The primary wall 42 includes an extension 48 that extends beyond the side walls 44 and terminates in a hooked end 50 that extends transversely between the side walls 44 and generally perpendicularly relative to the primary wall 42. The primary wall 42 includes a slot 52 that may be aligned with an opening 54 in the rear legs 18 or an opening 55 in the top members 20. A handle 56 is preferably provided on a threaded shaft or bolt 58 that is received in the slot 52 and opening 54 or opening 55 and is received by a weld nut 60 or other threaded member that is aligned with the opening 54 or 55. Handle 56 is provided to facilitate assembly or adjustment of the detachable anchor plates 40 on the stand 10. Similarly, threaded shafts 58 including handles 56 and weld nuts 60 or other threaded members are also used to secure channel segment 62 on opposite ends of the front and rear longitudinal braces 32, 34 so that they may be easily disassembled from the front and rear legs 16, 18 to permit the stand 10 to be disassembled if desired without the use of tools.

Wheels 64 are provided at one or both ends of the stand 10 to facilitate movement of the stand and an attached sheet metal tool. As will be readily appreciated, if desired, two or four wheels may be provided. If desired for shipment or additional stability, the wheels 64 may be removed. Wheels 64 are secured to the stand by bolts 65 and weld nuts 66.

Figure 14:
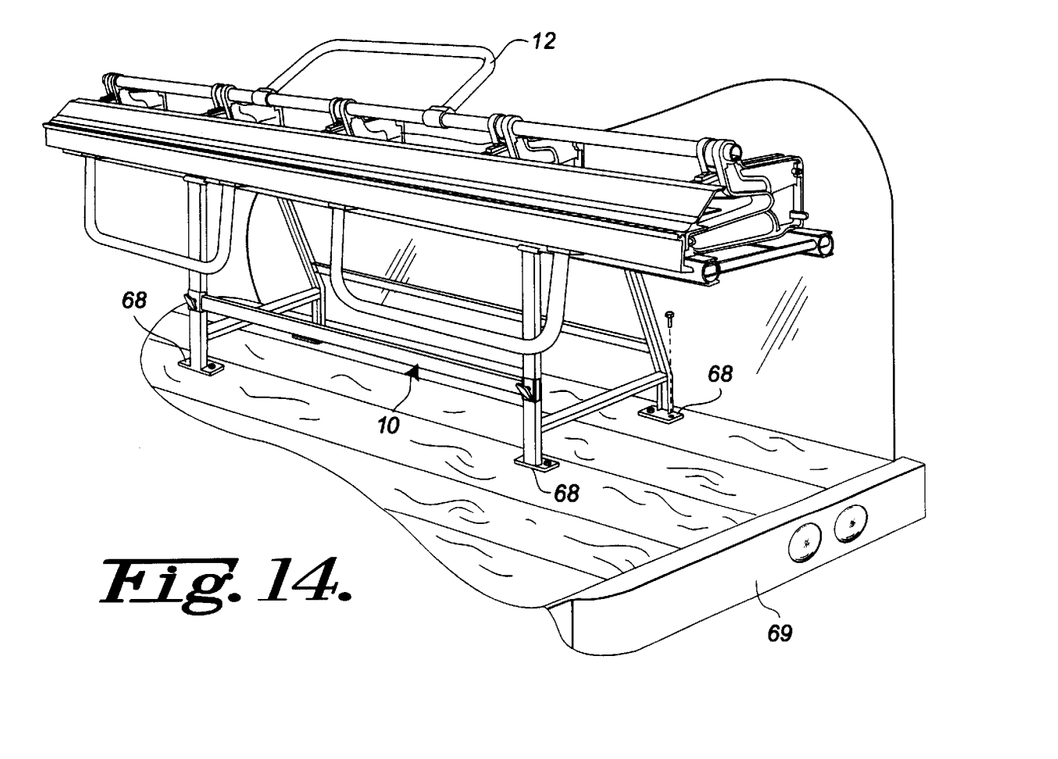
FIG. 14 is a perspective view of a bending brake and stand secured to a fragmentary section of the interior of a cargo van.

Plates 68 are secured to the lower ends of the front and rear legs 16, 18. The plates 68 are provided to distribute the weight of the stand and sheet metal tool. The plates 68 may also be provided with holes for fasteners that facilitate securing the assembled stand in a van or high cube truck 69 as shown in FIG. 14.

Referring to FIG. 3, the portable bending brake 12 includes I-beams 70. Alternatively, a tube center beam 70' as shown in FIG. 4, may be provided that are extruded members including a tube 72 and integrally formed top plate 74 and bottom plate 76. The top plate 74 provides a flat mounting surface for the portable bending brake 12' or other sheet metal tool while the bottom plate 76 provides a flat mounting surface to facilitate supporting the portable bending brake or other sheet metal tool on a stand. Either the I-beam 70 or tube center beam 70' may be secured to the stand 10 or by an anchor plate 40 secured to the rear legs 18 or top members 20.

Referring to FIG. 4, a different, larger portable bending brake 12' is shown secured to the stand 10. Referring back to FIG. 3, a smaller portable bending brake 12 may be secured to the top member 20 by securing a front portion of the brake to the fixed anchor plates 38 that are preferably welded in place on the front portion of the top members 20. The rear portion of the portable bending brake 12 is secured by means of detachable anchor plates 40 on the top members 20 that engage rear portions of the portable bending brake 12. Referring now to FIG. 4, a larger portable bending brake may be secured to the stand 10 with the front of the brake 12' being secured by means of the fixed anchor plates 38 while the detachable anchor plates 40 are placed on the rear legs 18 in the position shown in solid lines in FIG. 1 and in FIG. 4 wherein the hooked end 50 engages and restrains a rear portion of the portable bending brake 12'.

Figures 5, 6, 7:
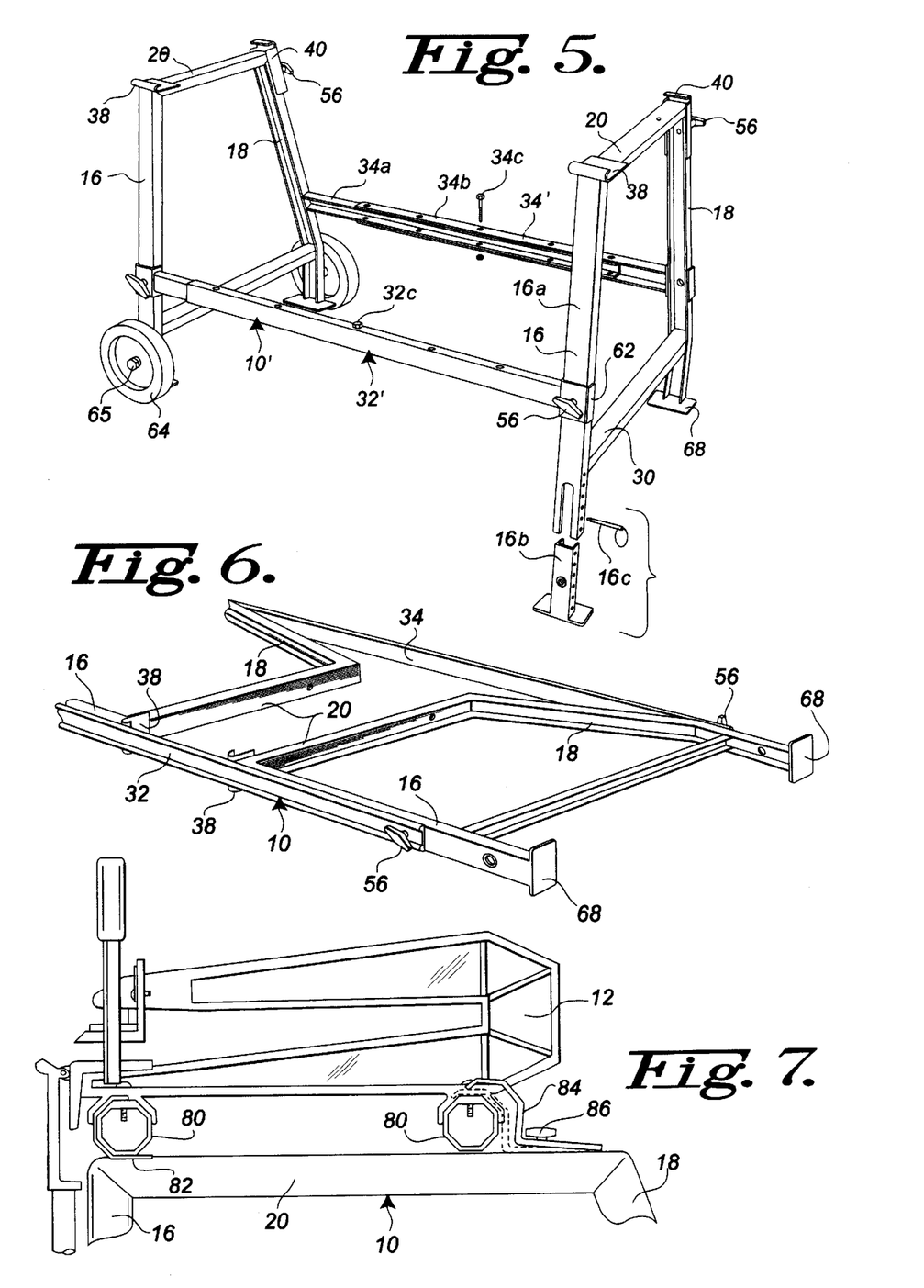
FIG. 5 is a perspective view of the stand having adjustable length cross members and telescopic legs.
FIG. 6 is a fragmentary perspective view of the stand in the folded position.
FIG. 7 is a fragmentary perspective view of a stand supporting a bending brake having octagonal base rail that is secured by a clamping member having a clamp for an octagonal rail.

Referring to FIG. 5, an adjustable length stand 10' is shown that has adjustable length or telescopic front longitudinal brace 32' and a telescopic rear longitudinal brace 34'. Front longitudinal brace 32' includes two channel members 32a and 32b that are secured together by a fastener 32c. Similarly, the rear longitudinal brace 34' includes telescopic channel sections 34a and 34b that are joined by means of a fastener 34c. The height of the stand 10' may be modified by providing telescopic legs comprising an upper leg 16a and a lower leg 16b that are locked together in a selected location by a pin 16c. In all other respects the stand 10' is essentially the same as the stand illustrated in FIG. 1 and the description of FIG. 1 is applicable to the stand shown in FIG. 5 and all reference numerals for similar parts are the same.

Referring to FIG. 6, the stand 10 is shown in its knocked down or collapsed position. The front legs 16 and rear legs 18 are folded to a position parallel to the front longitudinal brace 32 and rear longitudinal brace 34. When the stand is folded down it is easy to store and also may be easily transported.

Referring to FIG. 7, an alternative embodiment of the present invention is illustrated wherein the stand 10 supports a bending brake 12 that has octagonal beams. To anchor the octagonal beams 80 a fixed clamp 82 formed in a partial octagonal shape may be provided to secure the front portion of the brake 12 to the stand 10. A detachable anchor plate 84 includes a hook shape, partially octagonal section on one end and is secured to the top members 20 or rear legs 18 and are similar to the detached anchor plates 40 previously described.

Figure 8:
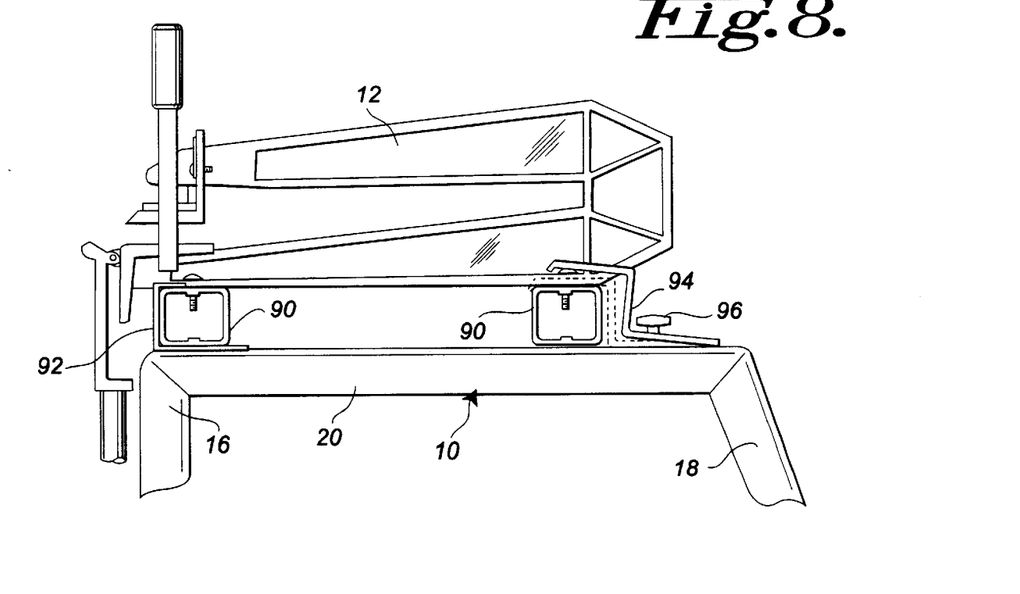
FIG. 8 is a fragmentary perspective view of a stand supporting a bending brake having box beam base rails that are secured by a clamping member having a clamp for a box beam.

Referring to FIG. 8, another alternative embodiment of the present invention is shown wherein a bending brake 12 is attached to a stand 10. The bending brake 12 includes rectangular or box section beams 90. The front end of the brake is secured by a means of a fixed anchor plate 92 that encompasses at least two sides of the rectangular beam 90. The detachable anchor plate 94 engages at least two sides of the rear rectangular beam and is secured in place by means of a threaded adjustment handle 96.

Figure 10:
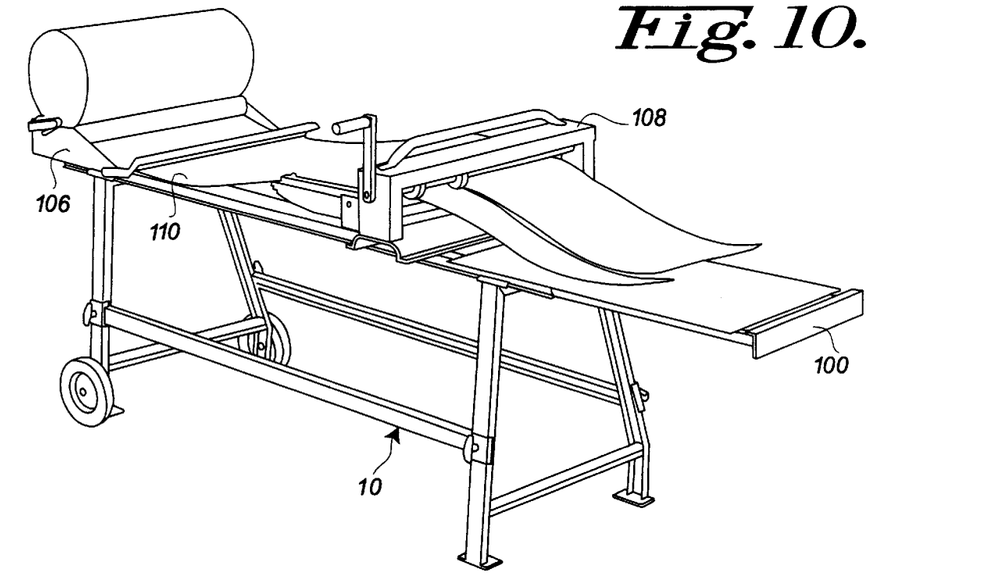
FIG. 10 is a perspective view of a stand, coil holder, and coil slitter in combination with a longitudinally telescopic extension.

Referring to FIG. 10, the stand 10 is shown with a coil holder 106 and coil slitter 108 mounted on the stand 10. Coiled sheet metal 110 may be unrolled from a coil retained in the coil holder 106 and slit by the coil slitter 108 that is supported on the same stand 10. By this arrangement, the coil holder 106 and coil slitter 108 are held in alignment and are conveniently operated with the extension member 100 being provided to support the sheet metal 110 after slitting.

Figure 11:
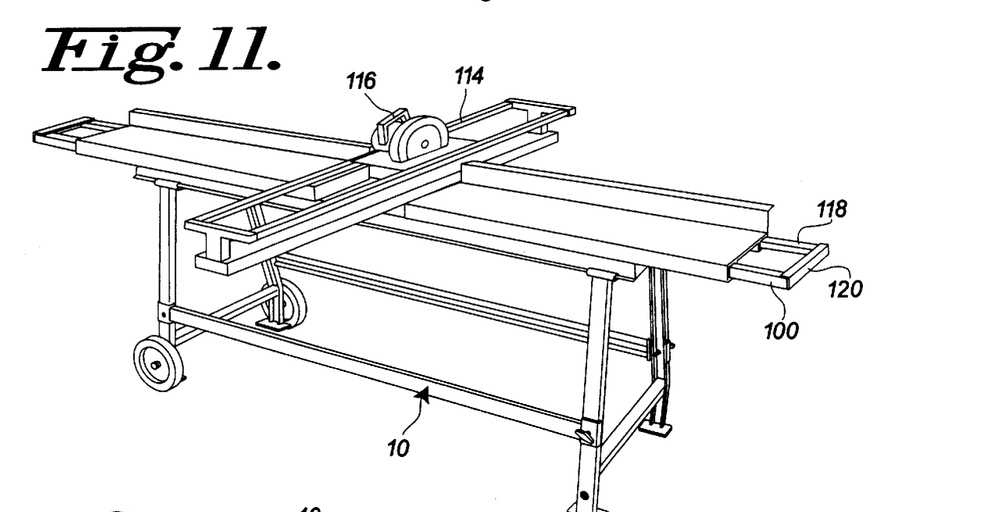
FIG. 11 is a perspective view of a saw table secured to the stand.
Figure 12:
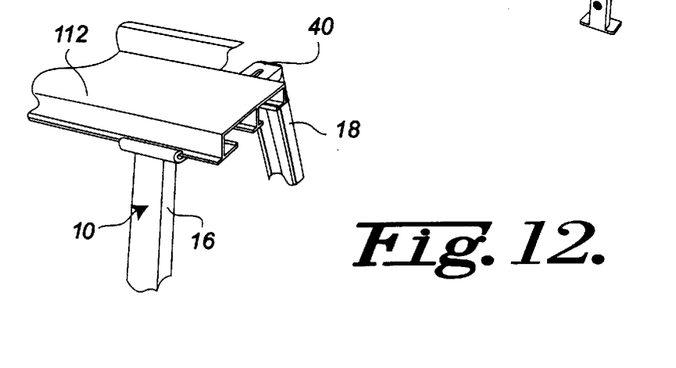
FIG. 12 is a fragmentary perspective view of a portion of a saw table base secured to the stand by a fixed clamp member.

Referring to FIGS. 11 and 12, a stand 10 is shown in combination with a saw table 112. Saw table 112 may have a different transverse dimension than either of the portable brakes shown in FIGS. 3 and 4 and may still be mounted to the stand 10. Saw table 112 includes a guide 114 for a saw 116 and also preferably includes an extension member 100. The extension member 100 is longitudinally movable and includes elongated telescopic portions 118 that are connected on their distal end by an end piece 120. The elongated telescopic portions 118 are preferably received by the saw table 112. It should be understood that the table 112 may have square, rectangular, hexagonal or other shaped receptacles and that the elongated telescopic portions 118 are selected to correspond thereto.

Figure 13:
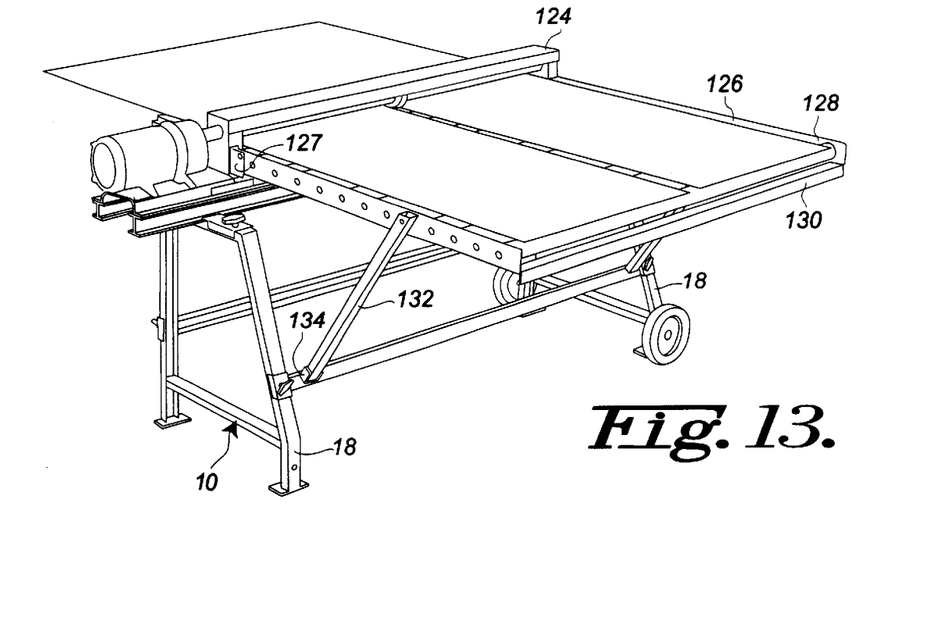
FIG. 13 is a rear perspective view of a stand and slitter having a roller table secured rearward of the slitter.

Referring to FIG. 13, the stand 10 is shown with a longitudinally extending power coil slitter 124 secured thereto. A roller table 126 is secured adjacent the coil slitter 124 by brackets 134. The roller table 126 includes right and left roller support members 128 that support opposite ends of rollers 130 that form the roller table 126. A brace 132 preferably extends between right and left roller support members 128 and brackets 134 that are attached to the rear legs 18 to facilitate supporting the roller table in a horizontal orientation. If it is desired to collapse the roller table 126, it may be disconnected from the brackets 134 and pivoted on pivot brackets 127 to a position generally parallel to the rear legs 18. Alternatively, the roller table 126 may be simply removed from the stand 10.

Figure 15:
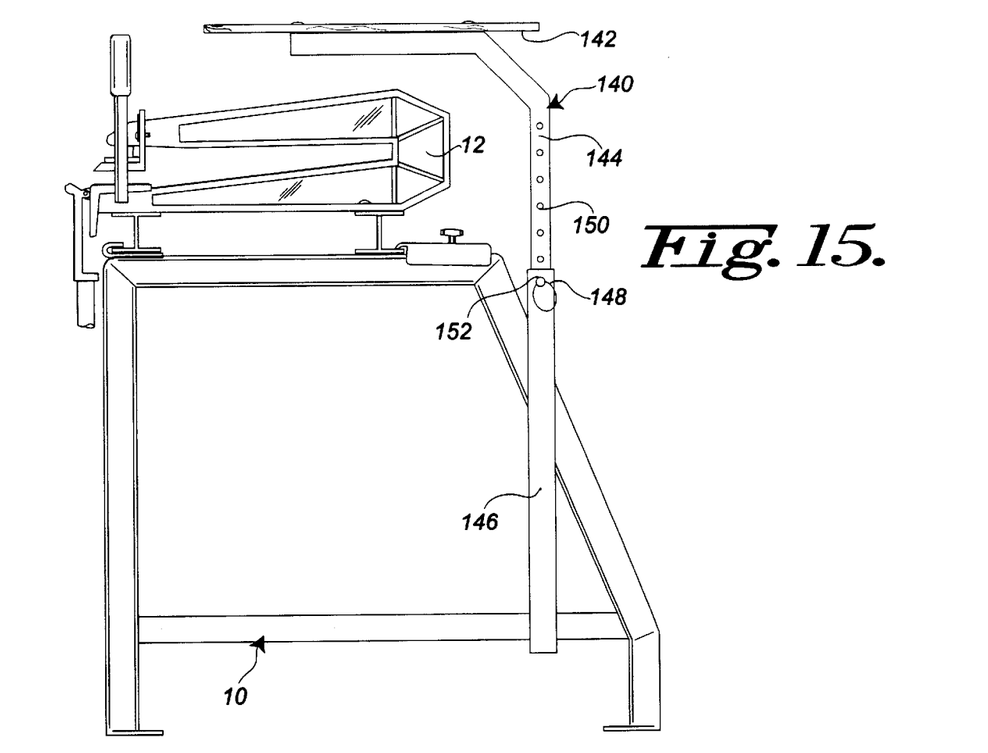
FIG. 15 is a side elevation view of a bending brake and stand having a raised work table above the brake.
Figure 16:
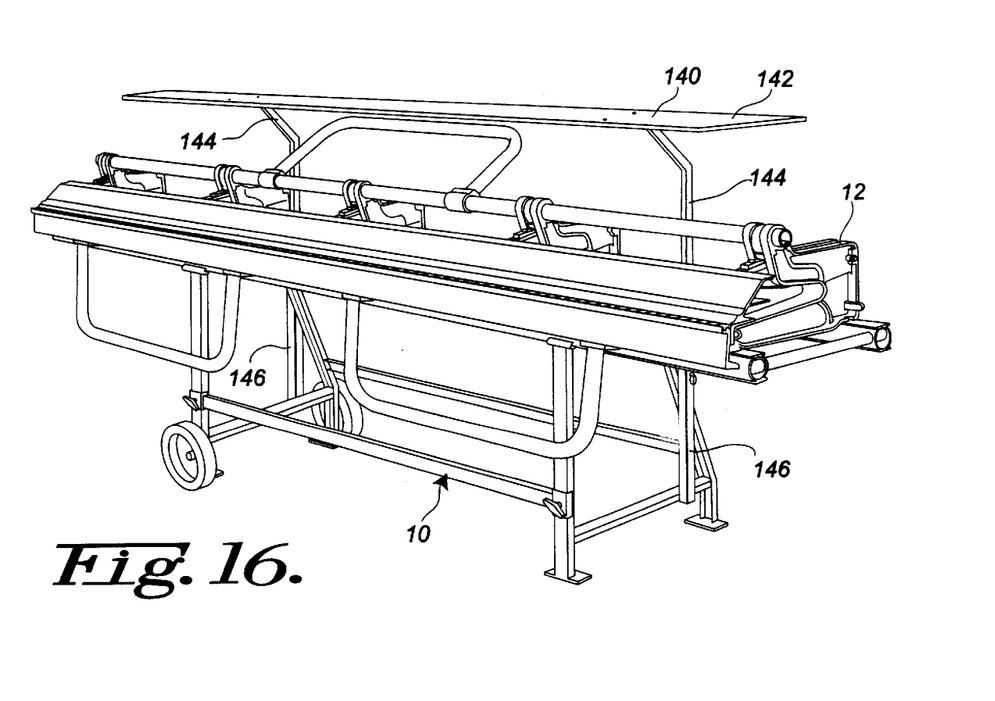
FIG. 16 is a perspective view of a bending brake and stand having a raised work table above the brake.

Referring to FIGS. 15 and 16, a stand 10 is shown with a brake 12 and also includes a work or layout table attachment 140. The layout table attachment 140 includes a horizontal table 142 that is secured to a pair of upper support arms 144 that are received in a lower section 146. Arms 144 and lower section 146 are preferably formed from box tubing with the arm 144 being sized to fit within lower section 146. A detachable pin 148 is inserted in apertures 150 formed in the upper arm 144 and aperture 152 formed in the lower section 146. The height of the table 142 may be simply adjusted by raising and lowering the arm 144 so that other holes 150 match up with the holes 152 in the lower section 146. The layout or work table 140 may be used by workmen to conveniently support plans, tools and supplies above the brake in a location that does not interfere with operation of the portable bending brake 12. The stand 10, including the table attachment 140, is collapsible in the same manner as the stand shown in FIG. 6 as described above.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A stand in combination with one or more of a plurality of detachable sheet metal tools having bases that each have a different transverse dimension comprising:

a plurality of legs supporting at least two top members;

a plurality of fixed anchor plates with one anchor plate being provided on each of the top members; and a plurality of detachable clamping plates with one of the clamping plates being selectively secured to either one of the top members or one of the legs in a range of spaced locations relative to one of the anchor plates depending upon the transverse dimension of the detachable sheet metal tool; and wherein the sheet metal tool is secured to the stand by the fixed anchor plates and the detachable clamping plates.

2. The combination of claim 1 wherein the plurality of legs includes a pair of front legs, a pair of rear legs, a plurality of fixed lower transverse members connecting one of the front legs to one of the rear legs, a front longitudinal brace connecting the pair of front legs, and a rear longitudinal brace connecting the rear legs, wherein the two top members connect an upper end of one of the front legs to an upper end of one of the rear legs.

3. The combination of claim 2 wherein the front and rear longitudinal braces are telescopic members that may be secured together in a range of lengths to accommodate different sizes of tools.

4. The combination of claim 2 wherein the front and rear legs each include telescopic front and rear leg portions that may be secured in a range of positions to provide a stand having adjustable height.

5. The combination of claim 1 wherein the clamping plates comprise a body having a primary wall and two side walls extending perpendicularly from opposite lateral sides of the primary wall, the primary wall being longer than the side walls defining an extension extending in one direction initially in the same plane as the primary wall and extending perpendicularly from a distal end of the extension and transversely relative to the lateral side walls.

6. The combination of claim 1 wherein the clamping plates have a channel shaped portion and a hooked end portion, the channel shaped portion having an opening for receiving a fastener that is provided to detachably secure the clamping plates to the stand with the hooked end portion securing a portion of the sheet metal tool to the stand.

7. The combination of claim 1 wherein the clamping plates have one end that is adapted to engage a portion of the sheet metal tool to secure the tool to the stand and a fastener system is provided for adjustably securing each of the clamping plates to the stand.

8. The combination of claim 7 wherein the fastener system comprises a threaded bolt received by a nut, wherein the fastener extends through at least one slot formed in either the stand or the clamping plate.

9. The combination of claim 1 wherein the sheet metal tools that may be secured to the stand are selected from the group comprising:

a bending brake;

a saw table;

a coil slitter; and a coil holder.

10. The combination of claim 1 wherein the plurality of legs comprise front legs and rear legs and further comprise at least two wheels attached to a front leg and a rear leg, respectively.

11. The combination of claim 1 further comprising a plurality of plates each being secured to a lower end of the legs.

12. The combination of claim 1 wherein the anchor plates are permanently affixed to the top members.

13. The combination of claim 1 wherein the plurality of legs includes a pair of front legs, a pair of rear legs, a front longitudinal brace connecting the pair of front legs, and a rear longitudinal brace connecting the rear legs, wherein the two top members connect an upper end of one of the front legs to an upper end of one of the rear legs.

14. A stand in combination with one or more of a plurality of detachable sheet metal tools having bases that each have a different transverse dimension comprising:

a plurality of legs supporting at least two top members;

a plurality of anchor plates with one anchor plate being provided on each of the top members;

a plurality of detachable clamping plates with one of the clamping plates being selectively secured to either one of the top members or one of the legs in a range of spaced locations relative to one of the anchor plates depending upon the transverse dimension of the detachable sheet metal tool; and wherein the sheet metal tool is secured to the stand by the anchor plates and the detachable clamping plates.

* * * * *